(No Model.) 6 Sheets—Sheet 2.
E. J. KERSHAW.
MACHINE FOR MANUFACTURING WOODEN TRAYS.
No. 501,079. Patented July 11, 1893.
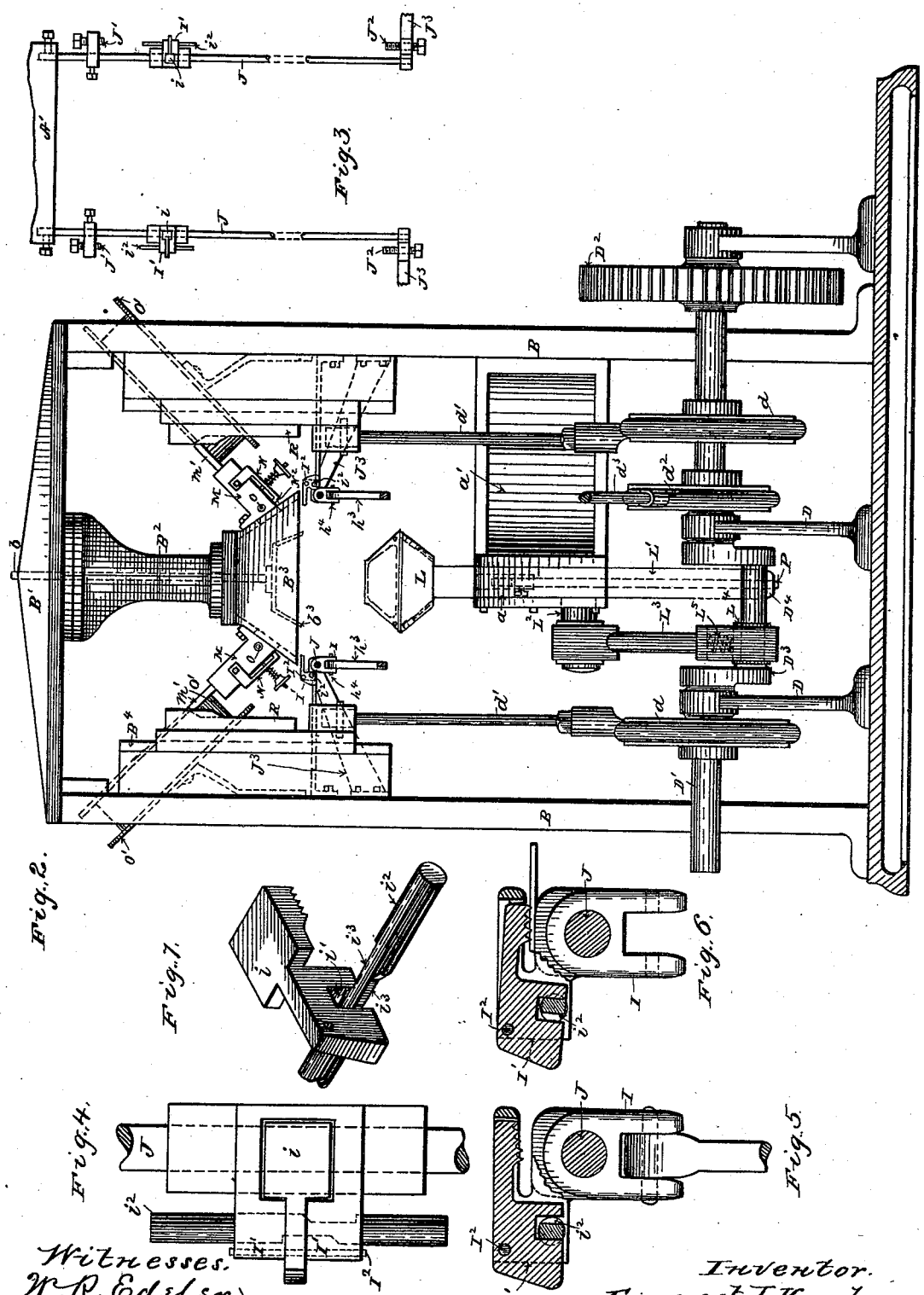

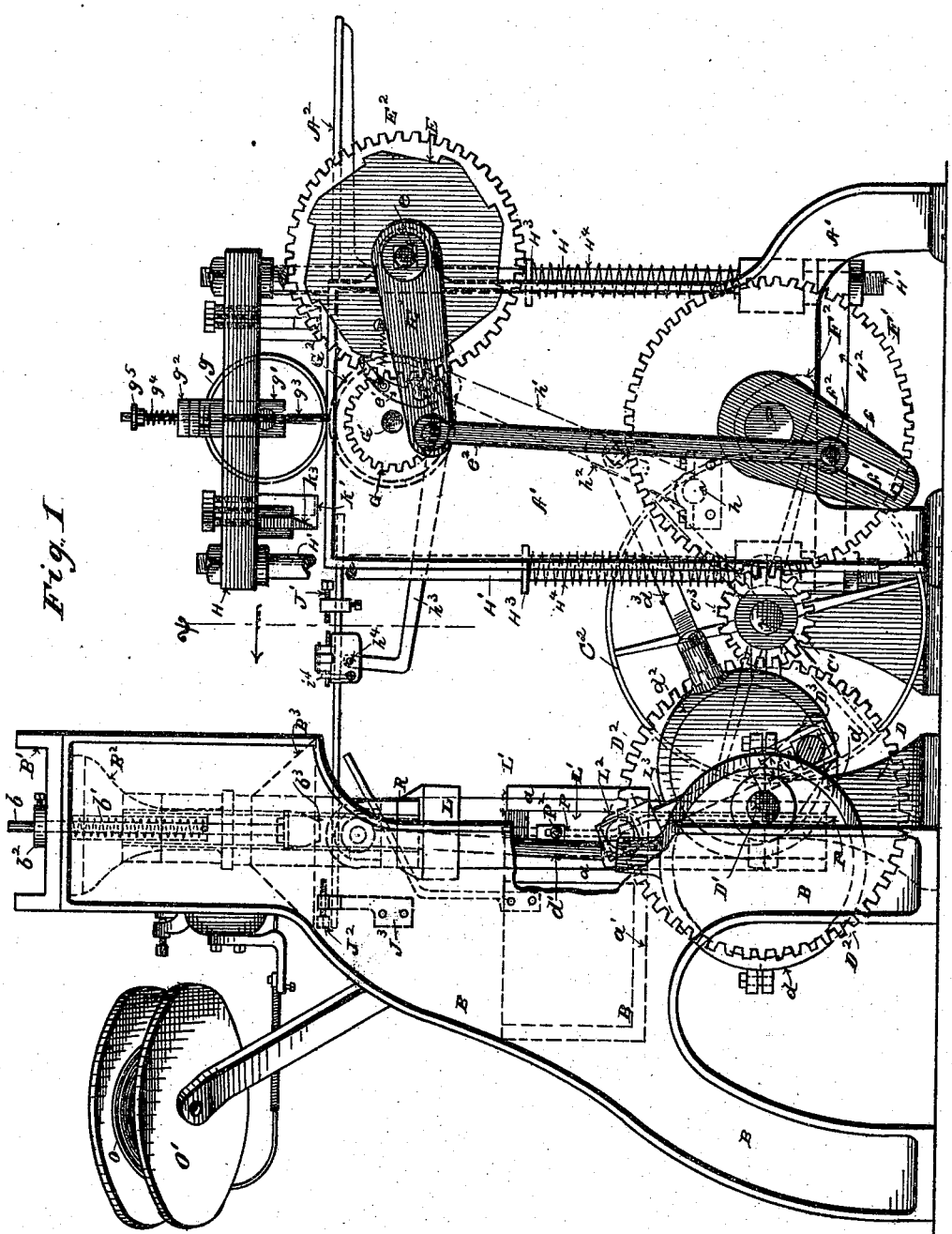

(No Model.) 6 Sheets—Sheet 3.
E. J. KERSHAW.
MACHINE FOR MANUFACTURING WOODEN TRAYS.
No. 501,079. Patented July 11, 1893.
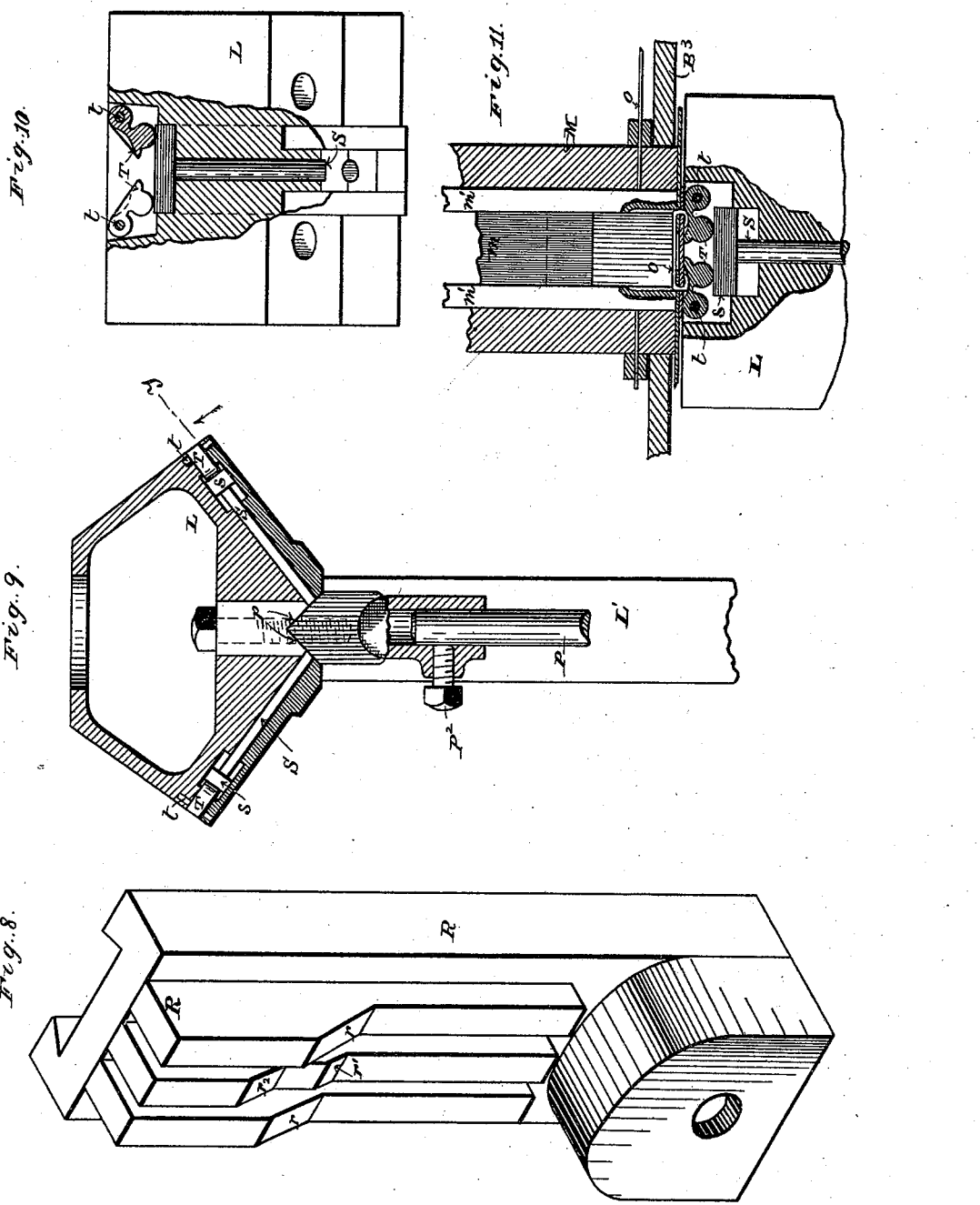
Witnesses.
W. R. Edilin.
S. G. Nottingham
Inventor.
Earnest J. Kershaw.
By Leggett & Leggett
Att'ys.

(No Model.) 6 Sheets—Sheet 4.
E. J. KERSHAW.
MACHINE FOR MANUFACTURING WOODEN TRAYS.
No. 501,079. Patented July 11, 1893.
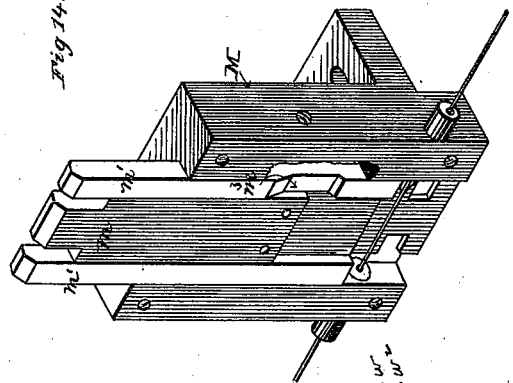
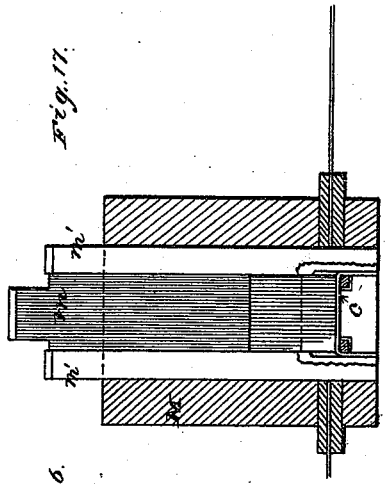
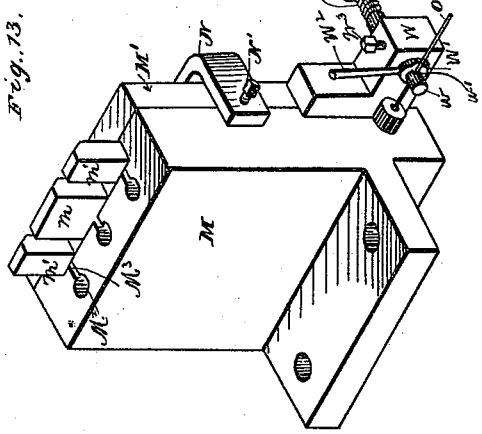
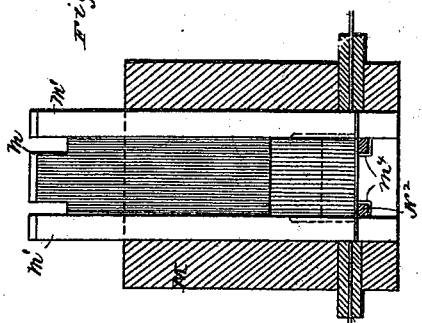
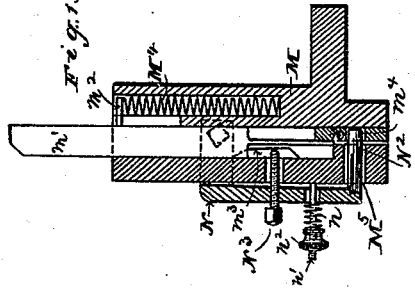
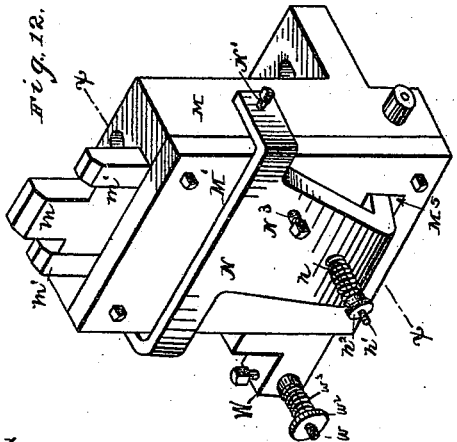
Witnesses
W. R. Edelen.
S. G. Nottingham
Inventor.
Earnest J. Kershaw.
By Leggett & Leggett
Attorneys.

(No Model.) 6 Sheets—Sheet 5.
E. J. KERSHAW.
MACHINE FOR MANUFACTURING WOODEN TRAYS.
No. 501,079. Patented July 11, 1893.
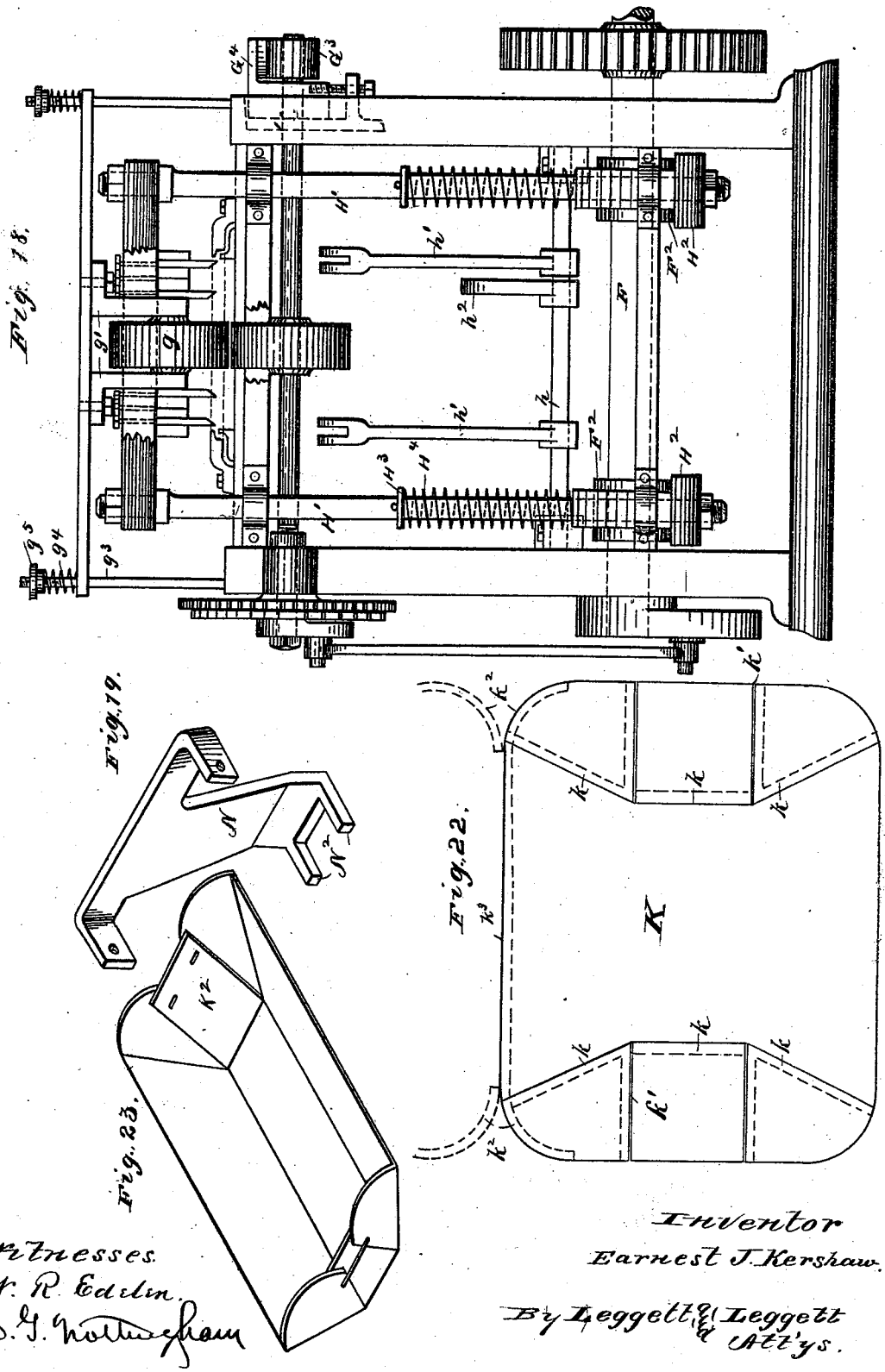
Witnesses
W. R. Edelin
S. G. Nottingham
Inventor
Earnest J. Kershaw
By Leggett & Leggett
Att'ys.

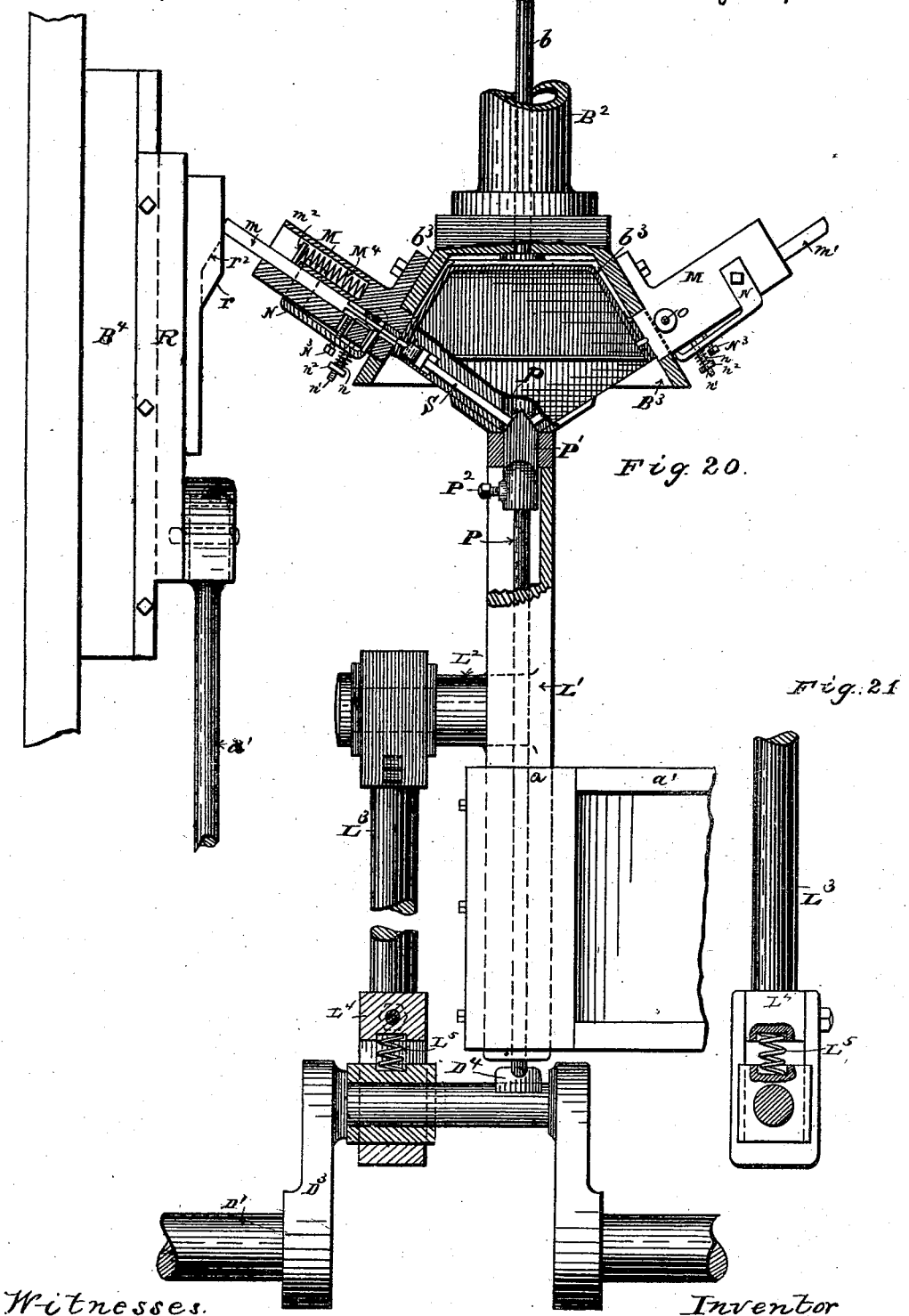

UNITED STATES PATENT OFFICE.

EARNEST J. KERSHAW, OF CLEVELAND, OHIO.

MACHINE FOR MANUFACTURING WOODEN TRAYS.

SPECIFICATION forming part of Letters Patent No. 501,079, dated July 11, 1893.

Application filed July 3, 1889. Renewed April 25, 1893. Serial No. 471,839. (No model.)

*To all whom it may concern:*

Be it known that I, EARNEST J. KERSHAW, of Cleveland, in the county of Cuyahoga and State of Ohio, have invented certain new and useful Improvements in Machines for Manufacturing Wooden Trays; and I do hereby declare the following to be a full, clear, and exact description of the invention, such as will enable others skilled in the art to which it pertains to make and use the same.

My invention relates to improvements in machines for manufacturing wooden trays of the variety manufactured from veneer and commonly known as butter-dishes; and it consists in certain features of construction and in combination of parts hereinafter described and pointed out in the claims.

In the accompanying drawings, Figure 1 is a side elevation. Fig. 2 is a front elevation from line $x\ x$, Fig. 1, looking in the direction of the arrow. Fig. 3 is a plan in detail of the gripper feeding mechanism. Fig. 4 is a plan, Figs. 5 and 6 elevations in section, and Fig. 7 a perspective of the grippers, these four figures being enlarged to full working size. Fig. 8 is a view in perspective of the reciprocating block R. Figs. 9, 10 and 11 are elevations in section in detail of the clinching-mechanism, Fig. 9 being taken at right angles to Figs. 10 and 11. Figs. 12 to 17, inclusive, are details of the staple-forming mechanism. Figs. 12, 13 and 14 are perspectives, showing reverse sides, the latter having the front plate removed. Fig. 15 is an elevation in section on line $x\ x$, Fig. 12. Figs. 16 and 17 are sections, showing the internal mechanism in different positions. Fig. 18 is an end elevation, partly in section. Fig. 19 is a view in perspective of tilting plate N. Figs. 20 and 21 are enlarged elevations, partly in section in detail. Fig. 22 is a diagrammatic view of the blank. Fig. 23 is a view in perspective, showing the completed work.

A represents the base of the machine, having the following attachments, to wit:—first, upright side-frames, A', A', for supporting table $A^2$, and mechanism for cutting the blanks; second, upright side-frames B, B, for supporting mechanism for shaping the blanks into trays and for securing, with staples, the overlapping sections of the trays; third, pillow-blocks, C, C, and D D, arranged in pairs, and supporting the driving-shaft C' and crank-shaft D'. The driving-shaft is provided with driving-pulley, $C^2$, usually mounted loose on the shaft and operated by means of a friction-clutch for stopping and starting the machine, although a clutch for the purpose is not material, as tight and loose pulleys would answer the purpose, but would not be so convenient as the friction-clutch. The latter is of ordinary construction and consequently not shown. The driving-shaft is also provided with pinion, $C^3$, the latter engaging gears, $D^2$ and F'. the former being mounted on crank-shaft D' and the latter being mounted on shaft F, shaft F being journaled in suitable boxes connected with the side-frames A'. Shaft D' is provided with crank, $D^3$, and with eccentrics, $d, d$, for operating the staple-forming devices, and with an eccentric, $d^2$, for actuating grippers that carry the blank to the shaping-dies, these eccentrics being provided, in the usual manner, with an eccentric-strap and rods, the latter being shown, respectively, at $d'$ and $d^3$. Shaft F is provided with an overhanging crank $f$, the latter having a longitudinal slot, $f'$, in which is secured wrist, $f^2$, the wrist being adjustable lengthwise of the slot to vary the throw of the crank.

E is a ratchet-wheel, which, together with rock-arm E', is journaled on stud $e$. This arm is provided with a spring-actuated pawl, $e'$, for engaging the ratchet-teeth of wheel E, and arm E' is, by means of pitman $e^2$, connected with the wrist $f^2$ aforesaid. Integral or connected with the ratchet-wheel is gear $E^2$ engaging gear G of shaft G'. On the latter shaft is mounted the lower feed-roller, $G^2$, the upper face of this roller extending through a slot in the table, the upper face of the roll being a trifle above the table. On the one end of shaft G' is mounted a friction roller, $G^3$, engaged by a brake-block, $G^4$, to prevent the feed-roller from moving too far by the momentum of the parts, and to prevent a possible slight retrograde movement from the back lash of the gear caused by the reversing of the pawl. The trunnions of the upper feed-roll $g$ are journaled in brackets $g'$ depending from the cross-bar $g^2$. The cross-bar operates on upright steady-pins, $g^3$, connected with the side-frames A' A' aforesaid, with springs, $g^4$, and adjusting nuts, $g^5$, above the cross-bar, by means of which the desired downward pressure is given to roller $g$.

H is a heavy platen to which are attached the knives for shaping, severing, slitting and scoring the blanks, this platen having a central opening for receiving loosely the upper roller $g$ and its supporting brackets. Platen H is mounted on four vertical rods, H', the latter reciprocating through boxes connected with the cross-bars of the machine, these rods in pairs being connected at their lower ends by cross-bars $H^2$, with jam-nuts above and below the cross-bars for adjustment. Each rod H' is provided with a collar $H^3$, and between the collar and the lower box of the rod is a spiral spring, $H^4$, coiled around the rod and bearing against the collar and box, the tension of these springs serving to elevate platen H and attachments. The platen is depressed by means of cam $F^2$ engaging cross-bars $H^2$, these cams being mounted on shaft F aforesaid. There is no novelty claimed in the arrangement of knives for shaping, scoring, slitting and severing the blank. The relative position of the knives, is however, shown in dotted lines, Fig. 22, in connection with the blank K. Knives $k$ are for scoring the blank where the bending is to occur. Knives $k'$ are for slitting the blank where the parts are to overlap in shaping the blank into tray K', see Fig. 23. Knives $k^2$ shape the adjacent corners of the contiguous blanks and knife $k^3$ severs the two blanks.

The material is in rolls, the veneer having been cut to the required width of the blank, the material being drawn into the machine by means of the feed-rolls aforesaid.

For delivering the several blanks to the shaping-dies I provide as follows: A rock-shaft, $h$, has attached rock-arms, $h'$, $h'$, and $h^2$, the latter being connected with eccentric rod $d^3$ aforesaid. Arms $h'$ are respectively pivoted to rods $h^3$, the latter in turn being pivoted at $h^4$, respectively, to sliding-blocks I, the latter serving as the lower jaws of the grippers. Blocks I are mounted with an easy fit, respectively, on parallel rods, J, the throw of arm $h'$ being sufficient to reciprocate the grippers the distance necessary in carrying the blank from its position on the table after it has been severed to the shaping-dies. Blocks I, on the outer sides thereof, are provided with upturned ears, I', between which ears are pivoted at $I^2$ the upper jaws $i$ of the grippers. An upper jaw has a depending member slotted at $i'$ for embracing rod or pin $i^2$, the latter having cams or inclines, $i^3$, arranged in reverse order and on opposite sides of the pin, by means of which the upper jaw is tilted in opening or closing the grippers by reciprocating pin $i^2$ endwise. Rods J are supported in any convenient manner, for instance, from table $A^2$ at the one end of the rod, the other end thereof being supported, for instance, by arms $J^3$ or other attachment of side-frame B. To the side of each block I is attached a slight flat spring $i^4$, the spring bearing against adjacent rod $i^2$, the spring serving as a brake to keep rod $i^2$ from shifting its position by the movement of the machine, except as this rod is actuated by engagement with stops J' $J^2$. The blanks, when severed, are in position overhanging the table, and the distended jaws of the grippers pass astride the edges of the blank, and just at the end of the throw of the grippers pins $i^2$ are engaged by stops J', by which engagement the pins are pushed endwise, thus closing the grippers upon the blank and holding the grippers closed. The reverse movement of the grippers carries the blank to a position between the shaping-dies, whereupon pins $i^2$ are engaged by stops $J^2$, by which engagement the gripper-jaws are opened and are held open until closed by the reverse movement of pins $i^2$ on the return stroke of the grippers. The parts are timed so that the grippers open just as the blank is grasped by the shaping-die mechanism.

B' is a cross-bar extending from one side-frame B to the other and secured to each, and from the center of this cross-bar depends a hollow arm, $B^2$, to the lower end of which hollow arm is attached the female member $B^3$ of the forming-dies. In the bore of arm $B^2$ operates a vertical rod, $b$, the rod having attached a spring, $b'$, for depressing the rod, and having attached an adjustable collar, $b^2$, located above the cross-bar for limiting the depression of the rod and attachments. To the lower end of rod $b$ is attached a thin flat spring, $b^3$. This spring is shaped substantially as shown in Fig. 20, so as to fit the inside of die $B^3$ lengthwise, the width of the spring being something less than the width of flap $K^2$ of the blank. In the depressed position of the rod and spring the extremes of the spring protrude slightly below the rim of die $B^3$, and consequently first engage the blank as the latter is being forced upward by the male die, by which engagement of the blank with the spring $b^3$ flaps $K^2$ are first bent inward, so that flaps $K^3$, by engaging the female die, are immediately afterward bent inward, and made to overlap outside flaps $K^2$. The upward movement of the male die retires spring $b^3$ that is to say by elevating rod $b$ and the attached spring so that the ends of this spring are above the slits where the staples enter, the depressed and elevated positions of spring $b^3$ being shown respectively in Figs. 2 and 20. The lower or male die L is mounted on what might be termed a plunger, consisting of a reciprocating channel-bar L' operating between ways $a$ of brackets $a'$, the latter being connected with and supported from one of the side-frames B. Bar L' is provided with wrist $L^2$ connected by pitman $L^3$ with crank $D^3$ aforesaid. The throw of this crank is considerably more than is necessary in actuating die L, and to accommodate such extra throw of the crank the upper member $L^4$ of the lower box of the pitman is provided with considerable play longitudinally, and this member of the box is backed by a strong spring L⁵. With such construction die L, having been forced home in pressing the blank into the female die, spring L⁵ yields or is compressed while the crank is moving some distance past the upper dead center, and consequently die L, for a time, remains at rest in its elevated position and long enough to admit of the staples being driven and clinched. Also, by means of such yielding pressure being applied to the lower die, any variation in the thickness of the blank does not affect the result and causes no material extra strain on the machine.

The staple-forming and driving mechanism is as follows: M, M, are housings secured externally to the sloping end walls of the upper die, the housings extending in the inclined position approximately at right angles to the inclined faces of the end walls of die B³. Each housing M has a removable side or cover, M', and inside the housing is a rectangular space filled by driver, $m$, and cutters, $m'$, $m'$, arranged with the cutters on either side of the driver, as shown, see Figs. 12 to 17 inclusive. Cutters $m'$ not only cut the wire, but bend the latter over a former, hereinafter described, to produce the staples. The housings are provided with longitudinal holes, M², each hole being connected by a slot, M³, with the chamber in which the driver and cutters operate. In each hole M² operates a spiral spring M⁴, and the driver and each cutter is provided with a pin, $m^2$, these pins, respectively, bearing on the outer ends of the different springs M⁴, the tension of these springs holding the driver and cutters in their normal or outward positions. One cutter of each housing is provided with an incline, $m^3$, shown more clearly in Fig. 14.

N is a tilting-plate pivoted at N' to the housing, this plate being shown detached in Fig. 19. The free end of plate N is provided with fingers, N², adapted to operate loosely in holes M⁵ of plate M'. The tilting-plate is swung outward by the engagement of incline $m^3$ with abutment-screw N³, the latter engaging a screw-threaded hole in plate N, the inner end of the screw passing loosely through a hole in cover M'. Plate N is reversed or swung inward by the action of spring $n$, this spring being coiled around a steady pin, $n'$, the spring bearing against the outer face of plate N and bearing against the washer and nut $n^2$ of the steady-pin. The latter extends loosely through a hole in plate N, the steady-pin being fastened to cover M' aforesaid. Fingers N², when plate N is in its closed position, extend under driver $m$, and extend also a short distance into recesses $m^4$ made in the back wall of the housing, by which arrangement the wire cannot possibly be forced past the ends of fingers N² in bending the wire. These fingers serve as a former over which the wire is bent in forming the staple. The wires O are drawn off of reels O', and fed into the machine approximately in lengths for the staples. The wire passes through lateral holes in the housing, as shown for instance in Fig. 14.

There are several varieties of feed-mechanism adapted to the purpose, such for instance, as small feed rolls, reciprocating or vibrating grippers, &c., any one of which is adapted to feed the wire into the machine. These different feed-devices, however, are well known for the purpose and hence are not shown, as they would only obscure other parts of the machine. This machine is run at such high speed that it is difficult to gage the wire-feed to just the length of wire required for a staple, and hence provision is made for the wire to pass through a hole in the opposite side of the housing, and hence the wire, if fed too fast, is cut off at both ends of the staple. Such trifling waste of wire is a matter of no importance, but by such practice the exact length for each staple is insured.

To the one edge of each housing U is secured block W. This block is provided with a lateral hole and into the enlarged screw threaded end of this hole is screwed hollow plug W', this plug, by means of pin W², being screwed into or out of the block to adjust the plug so that the face thereof will bear against wire O. Plug W' has preferably V-shaped grooves across the face thereof, these grooves crossing each other at the axis of the plug, and in adjusting the latter one of these grooves is brought in line with the wire, so that the wire will follow the groove as it is fed into the machine.

$w$ is a small rod that has a slot $w'$ through which the wire passes, this rod extending through the hole in block W and plug W'. Rod $w$, on the back side of the block, is provided with a thumb nut $w^2$ and between this thumb-nut and the block and bearing against each is a spring $w^3$, the latter being coiled around rod $w$. The thumb nut is manipulated to give tension to this spring, by means of which rod is drawn endwise, so that the wire is pressed against the end of plug W', and when the spring has been adjusted as desired the rod is secured by means of set screw W³. Wire O is of course small, and quite flexible, but as it is unwound from the reel, has a tendency to curve slightly, and the device just described is for straightening the wire before it enters the machine.

R, R are blocks reciprocating vertically on ways B⁴ of the side-frames, B, B, these blocks being connected, respectively, with eccentric-rods, $d'$, aforesaid. Each block R has two inclines, $r$, for engaging the outer ends of the opposing cutters $m'$. Each block R has also inclines, $r'$, $r^2$, for actuating the opposing drivers $m$. During the down-stroke of blocks R inclines $r$, $r$ and $r'$ simultaneously engage the opposing cutters and driver, thrusting these members endwise, the cutters severing the wire and bending the ends thereof down past the former (fingers M²). The short inclines $r'$ only move the driver far enough to press the wire firmly upon the former during the bending of the wire, but just as the bending is completed inclines $r^2$ engage the driver and press the latter still farther endwise for driving the staples. Meantime inclines $m^3$, by engaging abutment-screws $N^3$, will have tilted plate N, thereby withdrawing the former (finger $M^2$) from under the driver. With the upward movement of block R the different springs $M^4$ and $n$ aforesaid return the parts to the place of beginning.

Staples $o$, having been driven with the points of the staples passing through the overlapping sections of the tray, it only remains to describe the mechanism for clinching the staples.

Connected with bar or plunger L' aforesaid is a small rod, P, that is carried up and down with bar L', the rod passing loosely through suitable boxes connected with bar L', so that the rod may have a limited movement endwise independent of the bar, the rod being held by gravity in its depressed position relative to the bar. Rod P protrudes somewhat below the bar, and, during the time that the crank is passing the upper center, a trip or cam, $D^4$, connected with the crank-wrist, (see Fig. 20,) engages the lower end of rod P and thereby raises the rod a trifle, say an eighth of an inch, more or less, and after the engagement of the cam and rod is broken, the latter returns by gravity to its depressed position. The upper end of rod P is provided with a head, P', secured to the rod by set-screw, $P^2$, so that the head may be adjusted lengthwise of the rod. This head is V-shaped at the top, the two faces thereof, $p$, serving as cams or inclines. Inclines $p$ engage the lower ends of rods S, the latter operating in inclined holes in the lower wall of die L. The upper ends of rods S terminate in cross-heads, $s$, each cross-head engaging a pair of clinchers T. The clinchers are pivoted at $t$ to the wall of die L. The normal or depressed position of the clinchers and cross-head, effected by gravity, is shown in Fig. 10. The upward movement of head P' causes inclines $p$ to thrust rods S endwise, whereby cross-heads $s$ engage and close the clinchers in the position shown in Fig. 11, whereby the ends of the staples, protruding inside the wooden tray, are clinched, drivers $m$ meantime holding the staples in place during the clinching.

What I claim is—

1. In a machine for manufacturing wooden trays, the combination with a reciprocating die, of a crank arm adapted to have greater throw than said die, a pitman connected at one end to the reciprocating die and at the other end yieldingly connected to the crank arm by means of a sliding box backed by a spring, substantially as set forth.

2. In a machine for making wooden trays the combination with feed rollers, cutters, forming dies and cutters and drivers carried by the female die, of a gripper substantially as described located between the feed rollers and dies, driving mechanism and a lever connecting the gripper and driving mechanism, substantially as set forth.

3. In combination, grippers adapted to reciprocate endwise on ways from the cutting table to the forming dies and return, reciprocating pins connected with the respective grippers, such pins having cams or inclines for opening or closing the gripper-jaws, and stops for engaging and shifting such pins at the extremes of the gripper movements, substantially as set forth.

4. In combination, a vertically-reciprocating male die, having attached vibrating clinchers arranged in pairs, inclined gravity rods connected with the male die, each rod having a head for engaging and closing a pair of clinchers, and a vertical gravity-rod mounted on the plunger of the male die, such rod having inclines for actuating the inclined rods, substantially as set forth.

In testimony whereof I sign this specification, in the presence of two witnesses, this 13th day of May, 1889.

EARNEST J. KERSHAW.

Witnesses:
CHAS. H. DORER,
S. G. NOTTINGHAM.